3,393,211
NAPHTHOQUINONE COMPOUNDS
Michael H. Fisher and Clarence S. Rooney, Bridgewater Township, N.J., assignors to Merck & Co., Inc., Rahway, N.J., a corporation of New Jersey
No Drawing. Filed Sept. 14, 1965, Ser. No. 487,304
3 Claims. (Cl. 260—396)

ABSTRACT OF THE DISCLOSURE

Anticoccidial 2 -hydroxy - 3 - [3 - (4 - phenoxyphenyl)-propyl] - and 2 - hydroxy - 3 - [3 - (4 - p - halophenoxyphenyl)propyl]-1,4-naphthoquinones are prepared by reacting 2-hydroxy or 2,8-dihydroxy - 1,4 - naphthoquinone with a butyryl peroxide substituted in the 4-position with a phenoxyphenyl or halophenoxyphenyl radical. It is contemplated that dosage units of these active compounds will be administered orally in the control of coccidiosis in poultry.

---

This invention relates to novel chemical compounds, and to the chemical synthesis of such compounds. More particularly, it relates to 2-hydroxy-3-substituted propyl 1,4-naphthoquinones, to the preparattion thereof, and to the use of these novel naphthoquinones against the poultry disease coccidiosis.

The compounds of this invention may be represented by the structural formula:

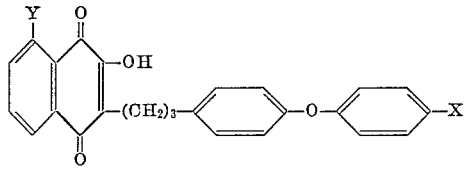

Y represents hydrogen or hydroxy, and X represents hydrogen or halo, preferably bromo or chloro, where in any given compound one of X and Y is always other than hydrogen. In the preferred compounds of the invention, one of X and Y is hydrogen while the other is not.

According to the invention, the novel compounds described above are prepared by reacting 2-hydroxy-1,4-naphthoquinone or 2,8-dihydroxy-1,4-naphthoquinone (I) with an alkylating agent which is a butyryl peroxide substituted in the 4-position with a phenoxyphenyl or halophenoxyphenyl radical, as illustrated in the flow diagram:

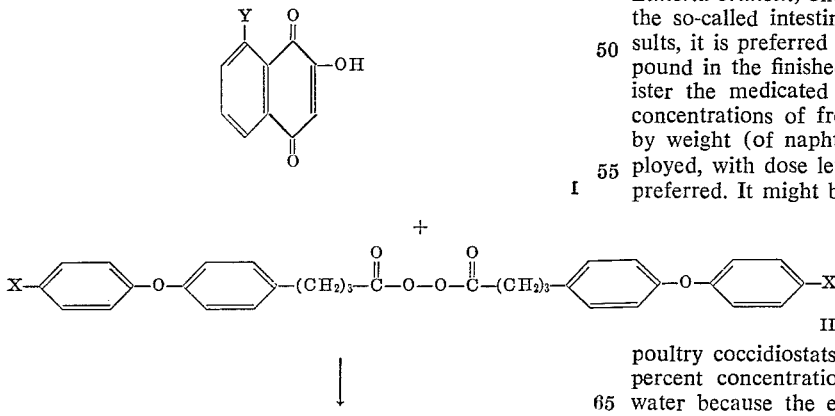

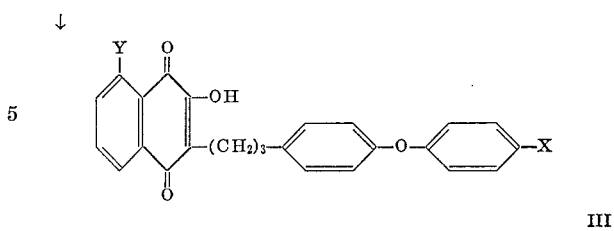

III where X and Y are as defined above. The two reactants are contacted in a suitable solvent medium such as acetic acid, and the reaction preferably brought about by heating at 60–110° C. for about 1–5 hours. It is desirable to employ the butyryl peroxide alkylating agent in slight molar excess, i.e. from 2.5–20% excess, but this is not essential and equimolar amounts of reactants, or excess 1,4-naphthoquinone, can be used if desired. On completion of the reaction the desired substituted naphthoquinone of Formula III above is recovered by methods that will be known to those skilled in the art. One convenient recovery method is removal of the reaction solvent by distillation, extraction of the residue into ether, and subsequent crystallization from ether after removal of by-products soluble in weak bases.

Examples of compounds provided according to this process by reaction of the appropriately substituted 1,4-naphthoquinone and butyryl peroxide are 2-hydroxy-3[3-(4-p-bromophenoxyphenyl)-propyl]-
   1,4-naphthoquinone;
2,8-dihydroxy-3[3-(4-p-bromophenoxyphenyl)-propyl]
   1,4-naphthoquinone;
2-hydroxy-3[3-(4-p-chlorophenoxyphenyl)-propyl]-
   1,4-naphthoquinone and
2,8-dihydroxy-3[3-(4-phenoxyphenyl)-propyl]
   1,4-naphthoquinone.

The novel compounds provided by this invention are active against poultry coccidiosis and are thus useful in the prevention and treatment of this parasitic disease when orally administered to poultry susceptible to it. For this purpose, they may be given in the feedstuff of the birds, in the drinking water, or if desired by direct administration dissolved or suspended in a suitable solvent. In any case, only minor amounts are required in order to obtain the desired anticoccidial result. These substances are useful in particular against coccidiosis due to the organism *Eimeria brunetti*, one of the species that is responsible for the so-called intestinal form of coccidiosis. For best results, it is preferred to disperse the naphthoquinone compound in the finished feed of the poultry, and to administer the medicated feed ad libitum to the birds. Feed concentrations of from about 0.0075% to about 0.05% by weight (of naphthoquinone in feed) are usually employed, with dose levels of about 0.01% to 0.03% being preferred. It might be mentioned here that dose levels of poultry coccidiostats are expressed in the art in terms of percent concentration of drug in the feed or drinking water because the exact amount of feed or water consumed by an individual bird is not measured as a matter of general practice.

The feedstuff compositions referred to above are those normally used in the poultry-raising industry. They may be so-called mashes containing ground grain, protein, and mineral and vitamin concentrates. Alternatively, they may consist of broiler feeds made up primarily of corn together with proteins and growth factors. In any event, the feedstuffs supplemented with the coccidiostats of this invention are nutritionally adequate ones for the poultry.

The anticoccidial compositions of the invention may contain one or more other coccidiostats in addition to the 3-substituted-2-hydroxy-1,4-naphthoquinones of Formula III above, and in many instances such combinations are preferred by the poultry grower.

The butyryl peroxides of Formula II above used as one of the reactants in the process of this invention are prepared from the corresponding butyryl chlorides by reaction of said latter substance with hydrogen peroxide. This method is described in some detail in Example 1.

The following examples are given for the purpose of illustration and not by way of limitation.

Example 1

A mixture of 50.3 g. (0.15 m.) of 4-(4-p-bromophenoxyphenyl)butyric acid and 20 ml. of thionyl chloride in 150 ml. of chloroform is heated for two hours on a steam bath. The mixture is then evaporated to dryness to give a residue of 4-(4-p-bromophenoxyphenyl)butyryl chloride. This acid chloride is dissolved in 200 ml. of ether at —5° C., and 10.8 ml. of 30% hydrogen peroxide added dropwise to the cold ether solution. 8.85 gm. of sodium hydroxide in 20 ml. of water is cooled to —5° C. and added dropwise to the ether solution, while maintaining the temperature of the ether at —5° C. with external cooling. 4-(4-p-bromophenoxyphenyl)butyryl peroxide crystallizes. It is recovered by filtration and washed with methanol. The ethereal filtrate is evaporated to near dryness, and methanol added to the residue. Additional peroxide crystallizes and is recovered by filtration.

The two crops of 4-(4-p-bromophenoxyphenyl)butyryl peroxide are combined and added to 225 ml. of glacial acetic acid containing 13.05 g. of 2-hydroxy-1,4-naphthoquinone. The mixture is heated for 3 hours at 95° C. and then evaporated to an oil. This oil is dissolved in about 1000 ml. of ether and the ethereal solution washed with saturated aqueous sodium bicarbonate until the washes become colorless. The ether solution is then washed with 60 ml. of dilute hydrochloric acid and 60 ml. of water, dried over sodium sulfate and evaporated to dryness. The residue is extracted with methanol and the crystals thus obtained are separated. They are predominantly 4-(4-p-bromophenoxyphenyl)butyric acid.

The methanol solution is concentrated to dryness and the residue thus obtained combined with methanol-insoluble material obtained from the ether concentration. The combined residues are crystallized from benzene-petroleum ether (30–60° C.) to give 2-hydroxy-3[3-(4-p-bromophenoxyphenyl)propyl] 1,4-naphthoquinone, M.P. 113–114° C. Recrystallization from absolute ethanol affords substantially pure material, M.P. 116–117° C.

The 4-(4-p-bromophenoxyphenyl)butyric acid employed as starting material in the above procedure is prepared from 3-(4-p-bromophenoxy)benzoyl propionic acid by reacting 120 gm. of said acid with 50 ml. of hydrazine hydrate and 70 gm. of potassium hydroxide in 500 ml. of triethylene glycol according to the method of Huang-Minlon, J. Am. Chem. Soc. 68, 2487 (1946).

2-hydroxy-3[3-(4-p-chlorophenoxyphenyl)propyl] 1,4-naphthoquinone is obtained according to the above method when 4-(4-p-chlorophenoxyphenyl)butyric acid is used in place of 4-(4-p-bromophenoxyphenyl)butyric acid, and 4-(4-p-chlorophenoxyphenyl)butyryl peroxide reacted with 2-hydroxy-1,4-naphthoquinone.

Example 2

6.3 gm. (0.033 m.) of 2,8-dihydroxy-1,4-naphthoquinone and 21 g. (0.036 m.) of 4-(4-phenoxyphenyl)butyryl peroxide is added to 100 ml. of glacial acetic acid, and the resulting mixture heated on a steam bath for two hours. The mixture is then concentrated to dryness in vacuo and the residue dissolved in about 700 ml. of diethyl ether. The ethereal solution is extracted with 600 ml. portions of saturated aqueous sodium bicarbonate until the aqueous extracts become essentially colorless. The ether solution is then washed with about 50 ml. of dilute hydrochloric acid and about 50 ml. of water, then dried over sodium sulfate. The ether solution is then evaporated to dryness to give 6.6 g. of 2,8-dihydroxy-3-[3-(4-phenoxyphenyl)propyl] 1,4-naphthoquinone. This is recrystallized from benzene-petroleum ether (60–120° C.) to give substantially pure material, M.P. 105–109° C.

2,8-dihydroxy-3-[3-(4-p-bromophenoxyphenyl)propyl] 1,4-naphthoquinone is obtained when the above procedure is carried out with 0.036 m. of 4-(4-p-bromophenoxyphenyl)butyryl peroxide instead of 4-(4-phenoxyphenyl)butyryl peroxide.

Any departure from the above description which conforms to the present invention is intended to be included within the scope of the claims.

What is claimed is:
1. A compound of the formula

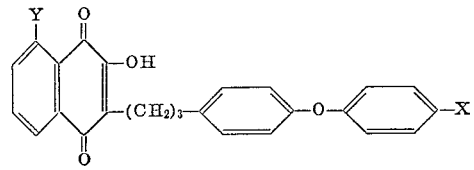

where X is hydrogen, chloro or bromo, Y is hydrogen or hydroxy, and one of X and Y is other than hydrogen.

2. 2,8-dihydroxy-3-[3-(4-phenoxyphenyl)propyl] 1,4-naphthoquinone.

3. 2-hydroxy-3-[3-(4-p-bromophenoxyphenyl)propyl] 1,4-naphthoquinone.

References Cited

Journal Chemical Society (London), 1963, by Hey et al., pp. 5604 to 5611 relied on.

LORRAINE A. WEINBERGER, *Primary Examiner.*

L. A. THAXTON, *Assistant Examiner.*